United States Patent Office 2,850,090
Patented Sept. 2, 1958

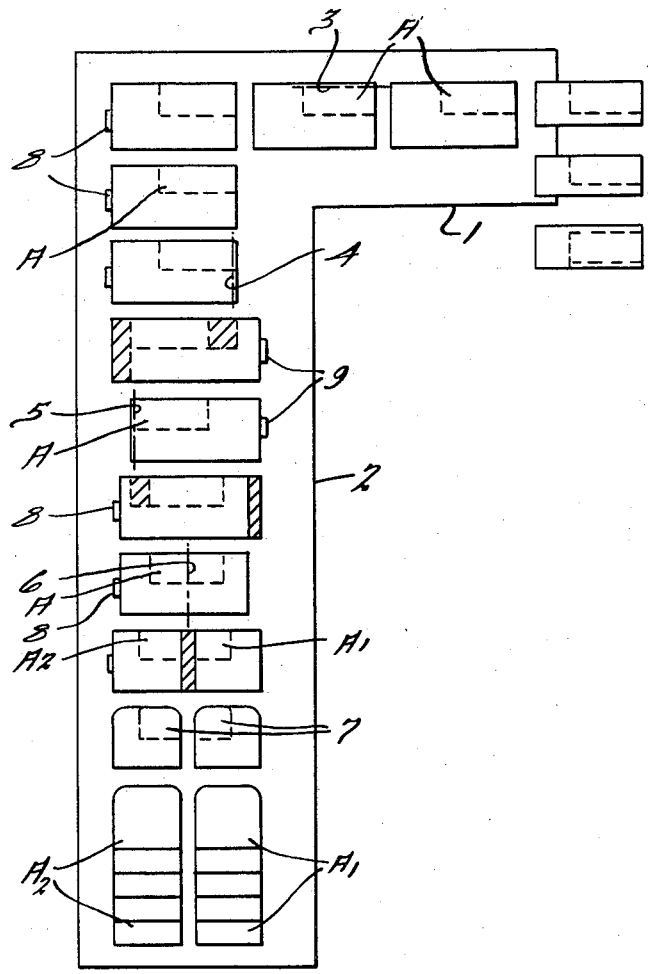

2,850,090

METHOD FOR TRIMMING, CUTTING, AND CORNERING FOLDED PAPER ARTICLES

Hans Biel and Ernst Pfäffle, Neuffen, Wurttemberg, Germany, assignors to Hans Sickinger, Providence, R. I., an individual Application September 25, 1956, Serial No. 611,894

Claims priority, application Germany November 5, 1955

3 Claims. (Cl. 164—17)

This invention relates to a method and machine for trimming, cutting and cornering exercise books, flat sheet piles and similar articles. The machine is adapted to be attached to other finishing equipment, such as wire stitching machines, pasting machines, high speed printing presses, and rotary presses, with a view to co-ordinating their production in a connected sequence of operations.

In known methods of combined trimming and cutting, the work is first cut in the middle and the two sections thus produced are then trimmed or edged. The disadvantage of this method is that the sections produced by the separating cut must be rearranged for subsequent operations. As a result, available space is inefficiently utilized; in addition, resetting of the machine in the case of size alteration is rendered inconvenient and may result in a prolonged interruption of operation.

It is an object of the present invention to avoid these drawbacks by providing a method and machine in which the long edge of the work is first trimmed, the sense of conveyance is then altered, one of the short edges and then the other short edge is trimmed, and finally the center cut is effected, all trims and cuts being made in the direction of conveyance at the time.

It is another object to provide a machine and method of this type in which the sense of conveyance of the work is altered in a direction perpendicular to the longitudinal or center cut, thus eliminating the need for special shifting movement of the work under the cutter which would cause loss of time and often give rise to other complications.

Other objects, features, and advantages of the present invention will become apparent from the subsequent description, taken in conjunction with the accompanying drawing.

The drawing represents a schematic top view of a suitable embodiment of a machine capable of carrying out the method of the invention.

The general ground plan of the machine is angular with two legs, 1 and 2, of unequal length preferably forming a right angle. The material A to be cut, in the form of a pile of rectangular blanks capable of being divided into two sections, is fed on from the free end of the short leg 1 and while being moved in this direction by a suitable conveyor is trimmed longitudinally with a cutter 3. After this operation, the sense of conveyance of work A is altered so as to move along leg 2. During this process the work is brought in the usual manner against a limit stop 8, in which position it is trimmed with a cutter 4 along the right hand short edge, for instance. Subsequently, with uninterrupted conveyance, work A is displaced a little to the right by conventional means against a stop 9, after which its left hand short edge is trimmed with a cutter 5. Work A is then repositioned towards the left, after which it is cut, or divided, with a cutter 6, thus producing two separate sections $A_1$ and $A_2$ which as a rule will be uniform in size. In the subsequent operation, the corners of the two sections $A_1$ and $A_2$ are rounded by means of punching tools 7.

In the next and final operation, the finished products are piled up in two bundles each consisting for example of five pieces of the two sections $A_1$ and $A_2$. Needless to say, such individual operations as corner-rounding may be eliminated, in which case the tool or tools concerned will be taken out or raised so as to be rendered ineffective.

It will be seen from the foregoing that, owing to the angular ground plan of the machine, the sheets always move in the direction of the cut. Lateral pushing or other special movements of the work under the cutters is dispensed with, thus offering substantial advantages in both a constructional and operational respect.

While it will be apparent that the preferred embodiment of the invention disclosed is well calculated to fulfill the objects above stated, it will be appreciated that the invention is susceptible to modification, variation and change without departing from the proper scope or fair meaning of the subjoined claims.

What is claimed is:

1. In a method for trimming and cutting paper piles or the like, the steps of moving a pile along a first path in one direction, trimming one edge of said pile along a line parallel to said first path, stopping the movement of said pile in a predetermined position, moving said pile along a second path perpendicular to said first path, trimming said pile along a line parallel to said second path, shifting said pile perpendicular to said second path to a second predetermined position, and trimming said pile along a second line parallel to said second path.

2. In a method for trimming and cutting paper piles or the like, the steps of moving a pile along a first path in one direction, trimming one edge of said pile along a line parallel to said first path, stopping the movement of said pile in a predetermined position, moving said pile along a second path perpendicular to said first path, trimming said pile along a line parallel to said second path, shifting said pile perpendicular to said second path to a second predetermined position, trimming said pile along a second line parallel to said second path, shifting said pile back to said first predetermined position, and cutting said pile into sections along a third line parallel to said second path.

3. In a method for trimming and cutting paper piles or the like, the steps of moving a pile along a first path in one direction, trimming one edge of said pile along a line parallel to said first path, stopping the movement of said pile in a predetermined position, moving said pile along a second path perpendicular to said first path, trimming said pile along a line parallel to said second path, shifting said pile perpendicular to said second path to a second predetermined position, trimming said pile along a second line parallel to said second path, shifting said pile back to said first predetermined position, cutting said pile into sections along a third line parallel to said second path, corner-rounding said sections, and gathering said sections in separate rows.

References Cited in the file of this patent

UNITED STATES PATENTS

| | | |
|---|---|---|
| 250,254 | Jordan | Nov. 29, 1881 |
| 254,202 | Euston | Feb. 28, 1882 |
| 2,015,990 | Booman | Oct. 1, 1935 |
| 2,017,462 | Kleineberg | Oct. 15, 1935 |
| 2,562,938 | Moyer | Aug. 7, 1951 |